Patented Nov. 12, 1935

2,020,291

UNITED STATES PATENT OFFICE 2,020,291

RUBBER COMPOSITION AND METHOD OF PRESERVING RUBBER

Albert M. Clifford, Stow, Ohio, assignor to Wingfoot Corporation, Wilmington, Del., a corporation of Delaware No Drawing. Application December 27, 1933, Serial No. 704,129

14 Claims. (Cl. 18—50)

My invention relates to the art of preserving rubber.

I have discovered that the class of substances which may be designated as hydroxy substituted aryl-naphthylamines are extraordinarily effective in retarding the deterioration of rubber and like materials. This new class of age-resisters or antioxidants includes such typical compounds as p-hydroxy phenyl alpha naphthylamine; p-hydroxy phenyl beta naphthylamine; the corresponding ortho and meta compounds; the hydroxy tolyl naphthylamines; the hydroxy biphenyl naphthylamines; N-phenyl 1,4 amino naphthol, and other analogous compounds including the phenyl, tolyl, naphthyl, etc. derivatives of 2,7 amino naphthol and 2,1 amino naphthol, as well as compounds containing more than one hydroxy group, such as the dihydroxy dinaphthylamines, dihydroxy phenyl naphthylamines, etc.

Any of the above-mentioned class of hydroxy substituted aryl naphthylamines may be incorporated into rubber or an unvulcanized rubber composition, preferably from 0.1 part to 5 parts by weight to 100 parts of rubber, and if desired the rubber may then be vulcanized by any method known to the art. The rubber or rubber composition so treated will deteriorate much less rapidly than if the age-resister were not employed. Since these compounds do not affect the rate of vulcanization of rubber, they may be added to existing rubber stocks without changing the time or temperature of vulcanization or the proportions of vulcanizing agents.

As a specific example of one embodiment of the process of this invention a typical rubber composition is prepared by mixing 100 parts by weight of extracted pale crepe rubber, 3 parts of sulphur, 5 parts of zinc oxide, 1.5 parts of stearic acid, 1 part of hexamethylene tetramine and 1 part of p-hydroxy phenyl beta naphthylamine. The stock so made up is vulcanized in a press for fifty minutes at 287° F. to produce an optimum cure. A rubber sample thus prepared is then submitted to an artificial ageing test by being maintained at a temperature of 158° F. (70° C.) in a constantly renewed stream of air (Geer oven test). A sample without rubber preservative is found to deteriorate far more rapidly than that containing p-hydroxy phenyl beta naphthylamine. Similar results are obtained by substituting any other member of the above-defined class of age resisters.

Although a single specific composition has been given above for illustrative purposes, it will be evident that this invention is applicable generally to rubber compositions of the most varied nature, and that all manner of rubber goods, including pneumatic and solid rubber tires, tubes, hose, belting, packing, boots and shoes, surgical rubber goods, seamless dipped rubber articles, etc., may have their useful life greatly prolonged by the practice of this invention. The hydroxy substituted aryl naphthylamines may also be applied to the surface of unvulcanized rubber, for example in the form of a paste, powder, or liquid, with good effect on its age resisting properties.

It is to be understood that the term "treating" as employed in the appended claims is used in a generic sense to include either the incorporation of the hydroxy substituted aryl naphthylamines into the rubber by milling or similar process, or by mixing with the rubber latex before coagulation, or by application to the surface of crude or vulcanized rubber. The term "rubber" is likewise employed in the claims in a generic sense to include caoutchouc, balata, gutta percha, rubber isomers and the like products, whether or not admixed with fillers, pigments, vulcanizing and accelerating agents.

While I have herein disclosed with considerable particularity certain preferred manners of performing my invention, I do not thereby desire or intend to limit myself solely thereto, for, as hitherto stated, the precise proportions of the materials utilized may be varied and other materials having equivalent chemical properties may be employed if desired without departing from the spirit and scope of the invention as defined in the appended claims.

What I claim is:

1. The method of preserving rubber which comprises treating rubber with an aryl naphthylamine having at least one hydroxyl group, substituted on an aromatic nucleus.

2. The method of preserving rubber which comprises treating rubber with an aryl naphthylamine having a single hydroxyl group substituted on an aromatic nucleus.

3. The method of preserving rubber which comprises treating rubber with a hydroxy substituted phenyl naphthylamine.

4. The method of preserving rubber which comprises treating rubber with a p-hydroxy phenyl naphthylamine.

5. The method of preserving rubber which comprises treating rubber with a p-hydroxy phenyl beta naphthylamine.

6. The method of preserving rubber which comprises vulcanizing rubber in the presence of an aryl naphthylamine having at least one hydroxyl group substituted on an aromatic nucleus.

7. The method of preserving rubber which comprises vulcanizing rubber in the presence of a hydroxy phenyl naphthylamine.

8. A composition of matter comprising rubber and an aryl naphthylamine having at least one hydroxyl group substituted on an aromatic nucleus.

9. A composition of matter comprising rubber and an aryl naphthylamine having a single hydroxyl group substituted on an aromatic nucleus.

10. A composition of matter comprising rubber and a hydroxy substituted phenyl naphthylamine.

11. A composition of matter comprising rubber and a p-hydroxy phenyl naphthylamine.

12. A composition of matter comprising rubber and p-hydroxy phenyl beta naphthylamine.

13. A vulcanized rubber composition which has been vulcanized in the presence of an aryl naphthylamine having at least one hydroxyl group substituted on an aromatic nucleus.

14. A vulcanized rubber composition which has been vulcanized in the presence of a hydroxy phenyl naphthylamine.

ALBERT M. CLIFFORD.